United States Patent

[11] 3,634,707

[72] Inventors Siegfried Tillner;
Heinz Heilmann; Joseph Ludemann, all of Oldenburg, Germany
[21] Appl. No. 882,194
[22] Filed Dec. 4, 1969
[45] Patented Jan. 11, 1972
[73] Assignee Licentia Patent-Verwaltungs-GmbH Frankfurt am Main, Germany
[32] Priorities Dec. 5, 1968
[33] Germany
[31] P 18 12 780.5;
Dec. 5, 1968, Germany, No. 68 09 931.0
Continuation-in-part of application Ser. No. 650,298, June 30, 1967, now Patent No. 3,500,092, dated Mar. 10, 1970. This application Dec. 4, 1969, Ser. No. 882,194

[54] MOTOR
13 Claims, 10 Drawing Figs.
[52] U.S. Cl.................................................. 310/172, 310/269
[51] Int. Cl...................................................... H02k 17/10
[50] Field of Search.......................................... 310/172, 186, 187, 194, 162, 163, 261, 269, 211, 67

[56] References Cited
UNITED STATES PATENTS

| 2,490,021 | 12/1949 | Aske | 310/211 |
|---|---|---|---|
| 2,773,999 | 12/1956 | Morrill | 310/172 |
| 2,815,460 | 12/1957 | Jones | 310/172 |
| 2,845,553 | 7/1958 | Oldenkamp | 310/172 |
| 3,214,619 | 10/1965 | Vaske | 310/172 |
| 3,500,092 | 3/1970 | Heilmann | 310/172 |

FOREIGN PATENTS

| 1,537,771 | 8/1968 | France | 310/172 |
|---|---|---|---|

Primary Examiner—D. F. Duggan
Assistant Examiner—R. Skudy
Attorney—Spencer & Kaye ABSTRACT: The electrical characteristics of a centrosymmetrical-shaded pole motor having salient poles and concentrated windings are improved by shaping the poles of the motor so that the angle enclosed between the pole axis and the neutral axis on the shaded pole side of the pole axis is less than that on the main pole side, the shaded pole arc is at most equal to one-fifth of the pole pitch, and the airgap adjacent to the pole has a nonuniform configuration such that the harmonics of the excitation field, and in particular, the third harmonic, are substantially eliminated, whereby the starting torque, the breakdown torque and the efficiency of the motor are improved.

Inventor:
Siegfried Tillner
Heinz Heilmann
Joseph Ludemann

BY *Spencer & Kaye* ATTORNEYS.

Inventor:
Siegfried Tillner
Heinz Heilmann
Joseph Ludemann

BY *Spencer & Kaye* ATTORNEYS.

$M_d = f(n)$.
$P_0 = 35$ W
1: $\delta = const = \delta_0 = 0.25$ mm
2: $\delta_0 = 0.25$ mm
   $\delta_{max} = 0.59$ mm Inventor:
Siegfried Tillner
Heinz Heilmann
Joseph Ludemann BY *Spencer & Kaye* ATTORNEYS.

MOTOR

CROSS-REFERENCE TO RELATED APPLICATION

This application is a continuation-in-part of applicant copending U.S. Pat. application Ser. No. 650,298 filed June 30, 1967, now U.S. Pat. No. 3,500,092 issued Mar. 10, 1970.

BACKGROUND OF THE INVENTION

The present invention relates to shaded-pole motors with a centrosymmetrical construction and concentrated windings on salient poles with a partially widened airgap.

The field curves of motors having a small number of stator grooves, and particularly those with salient poles and concentrated windings, exhibit a high proportion of field harmonics which result in a general decrease in the efficiency of such motors. In order to operate, salient-pole motors having concentrated windings, including those having shaded-pole portions, require magnetic bridges from pole to pole. These magnetic bridges may be in the form of stray flux sheets inserted between the pole edges or pole tips or in the form of punched-out connecting bars for stator laminations consisting of a pole sheet and a yoke ring, or in the form of pole tips approaching one another to form a narrow gap in the so-called motors without stray flux sheets. The dimensions of these magnetic bridges and the irregular construction of the airgap influence, on the one hand, the useful flux entering the rotor and the stray flux and, on the other hand, reduce the amplitude of the harmful harmonics. The many effects of a change in these configurations, however, make the desired shaded-pole motor design more difficult with respect to its efficiency and torque-speed characteristic, as well as with respect to its starting torque, its reaching maximum speed and its breakdown torque. Additionally, modifications alone of the configuration of the magnetic bridges, insofar as it is practically possible, will not eliminate to the desired extent the losses and torque dips resulting from the field harmonics present in the acceleration curves.

It has already been proposed, for AC motors with salient poles, to decrease the length of the airgap between the rotor and the stator by giving the stray paths therebelow a fraction of the length of the airgap below the poles in order to arrive at a better and more effective electrical utilization of these motors (see German Pat. No. 1,040,122). Moreover, it is known to increase the size of the airgap below the auxiliary poles on AC motors having an auxiliary capacitor phase and salient poles, especially in order to decrease the leakage of harmonics in the airgap (see German Pat. No. 1,178,503). It is to be understood that as used throughout this application, the term "length" when referring to the airgap means the distance between the stator and the rotor in a plane transverse to the axis of rotation of the motor.

In shaded-pole motors having stray flux bars on sheets provided between the pole tips, the airgap below the main pole portion can be continuously increased in length in the direction toward the pole tip or end, or recesses can be provided in the region of the shoulder of the main pole tip and in the main pole tip itself in order to allow for a certain amount of control and to increase the efficiency (see French Pat. No. 1,064,568).

A uniform step-type enlargement of the airgap below the main pole tip in shaded-pole motors having mechanically interrupted magnetic bridges, so-called motors without stray flux laminations, has been proposed several times with varying explanations of their effects (e.g., German Pat. Nos. 212,073 and 597,982, French Pat. No. 1,152,925, and U.S. Pat. No. 2,591,117).

Similar proposals including recesses in the area of the main pole tip and considering an offset rotor were made for a shaded-pole motor with salient poles and mechanically interrupted magnetic bridges in order to achieve a better starting torque and good operational efficiency or to attain a balance between the former and the latter, for example (U.S. Pat. No. 2,827,583). In such a shaded-pole motor, the dip in the acceleration curve is reduced by a magnetic constriction in the form of a slit in the shoulder of the main pole tip (see U.S. Pat. No. 2,815,460).

The measures already proposed for correcting the size of the airgap by effecting an estimated continuous or progressive enlargement of the airgap between the pole tips or toward the main pole tip, for example, do not result in the best possible utilization of the stator lamination cross section in shaded-pole motors. The same is true of the provision of stamped perforations in the poles extending toward the main pole tip or in the pole tip itself in order to create magnetic saturation zones, and of a decreased pole tip width serving as a constriction. They all result only in production and technical difficulties.

In all shaded-pole motors of the salient-pole type having inserted stray flux sheets and in all such motors without stray flux sheets, the pole arcs for the pole tips are symmetrically identical so that neutral zones result in the center of the space between the poles. In motors with closed punched-out magnetic bridges whose stator laminations are provided with a single-sided magnetic yoke, (particularly with the smaller shaded-pole motors) or consist of an annular yoke having a pole sheet inserted therein, narrow magnetic passages in the form of slits or holes in the magnetic bridges near the shaded-pole windings and main pole tips which narrow toward the shaded pole and thus are sickle shaped, have been proposed in order to determine the flux distribution. The neutral zones provided by these narrow magnetic passages are no longer disposed in the center between the poles but form an angle which is less than 90° with the pole axis on the side of the shaded pole, so that the shaded-pole arc corresponds to approximately one-third of the pole pitch. By this means it is possible in these shaded-pole motors to achieve, depending on position and size of the narrow magnetic passage, a further improvement either with respect to the starting torque, the breakdown torque, or the degree of efficiency (U.S. Pat. No. 2,412,207).

The previous measures do not, however, permit free design of the shaded-pole motors, since the various motor characteristics are interrelated and an increase in the value of one of the above-mentioned motor characteristics leads to a decrease, or adverse influence, on another motor characteristic. Moreover, measures to increase the distribution of harmonics in the rotor by a reduction in the number of grooves or by closed rotor grooves or by extremely offset rotor grooves result only in a decrease in efficiency for the fundamental field.

All previously proposed measures to increase the airgap field in asynchronous motors with salient poles are of an empirical nature, gained by assumptions from experience.

SUMMARY OF THE INVENTION

It is the object of the present invention to eliminate the uncertainties in the design of shaded-pole motors, particularly those of centrosymmetrical construction, and to further improve, in addition to the starting torque, the degree of efficiency without having to suffer reduced starting torque and a lower dip in the starting characteristic.

This and other objects are achieved, according to the present invention, for centrosymmetrical shaded-pole motors having salient poles and concentrated windings in that each of the salient poles is shaped so that:

a. the neutral axis (which for motors having an inserted stray flux sheet and the so-called motors without stray flux sheet passes through the slit between the ends of the pole tips and for motors with punched out stray flux rods passes through the narrow magnetic passage) and the pole axis enclose on the shaded-pole side of the pole axis, an angle which is less than that on the main pole side;

b. the shaded-pole arc or the shaded-pole covering, is one-fifth or less than one-fifth of the pole pitch; and c. the airgap adjacent to the pole has a configuration across at least the main pole portion of the pole face which conforms substantially to the equation:

$$\delta_x = \delta_m + \delta_m \left[ \frac{\hat{B}_3}{\hat{B}_1} \sin(3x + \varphi_3) \right.$$
$$\left. + \frac{\hat{B}_5}{\hat{B}_1} \sin(5x + \varphi_5) \ldots + \frac{\hat{B}_n}{\hat{B}_1} \sin(nx + \varphi_n) \right] \quad (1)$$

where:

$\delta_x$ = the desired airgap size at any point $x$ measured across the pole pitch,
$\delta_m$ = a preselected median airgap length;
$B_1$ = the peak value of the fundamental of the flux field,
$B_3$ = the peak value of the third harmonic of the flux field,
$B_5$ = the peak value of the fifth harmonic of the flux field,
$B_n$ = the peak value of the $n$th harmonic of the flux field,
$\sigma_3, \sigma_5, \sigma_n$ = the phase angles of the corresponding harmonics,
$x$ = the electric angle of each point across the pole pitch.

The equation is based on the concept that for a given flux the length of the airgap should be inversely proportional to the total flux density, or induction.

The shape of the airgap is determined according to the above equation with the aid of the harmonic field analysis based on the torque-speed characteristic of the machine. The flux distribution and thus the starting torque and the breakdown torque can be determined by rotating the neutral zone toward the shaded pole and by the clear determination in the case of punched stray flux bars by means of slits, coupled with the reduction in size of the shaded-pole covering.

DESCRIPTION OF THE PREFERRED EMBODIMENTS

Experience has shown that it is sufficient for the practical considerations of the stator lamination cross section of motors with salient poles to consider only the third field harmonic and to assume its spatial phase angle with respect to the fundamental to be 0. The above-mentioned equation (1) is then simplified to:

$$\delta_x = \delta_m + \delta_m \left[ \frac{\hat{B}_3}{\hat{B}_1} \sin 3x \right] \quad (2)$$

Figure 1:
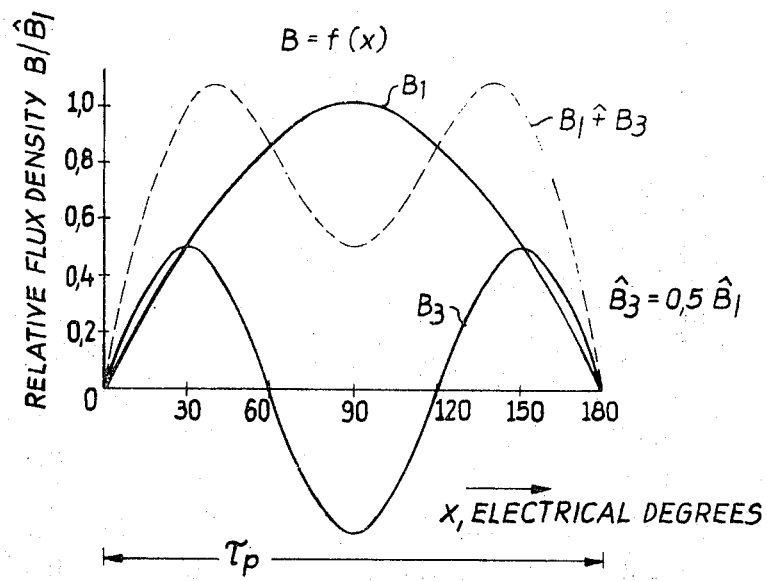
FIG. 1 is a chart containing curves illustrating the fundamental, third harmonic and composite or total flux density in a motor of the type to which the invention is directed.

FIG. 1 shows a curve $B_1 \hat{+} B_3$ of the total flux density, or induction, which results from the fundamental $B_1$ having a peak value of $\hat{B}_1$ and a positive third harmonic flux $B_3$ having a peak value of $\hat{B}_2$ and in phase with the fundamental, $\hat{B}_3$ being assumed to be equal to 0.5 $B_1$. The third harmonic could be generated from the phase of a capacitor motor. To bring the field curve $B_1 \hat{+} B_3$ back to sinusoidal form, the inductance of the magnetic flux path would have to be decreased along the pole pitch at the locations of the electrical angles of 30° and 150° and would have to be increased at 90°.

Figure 2:
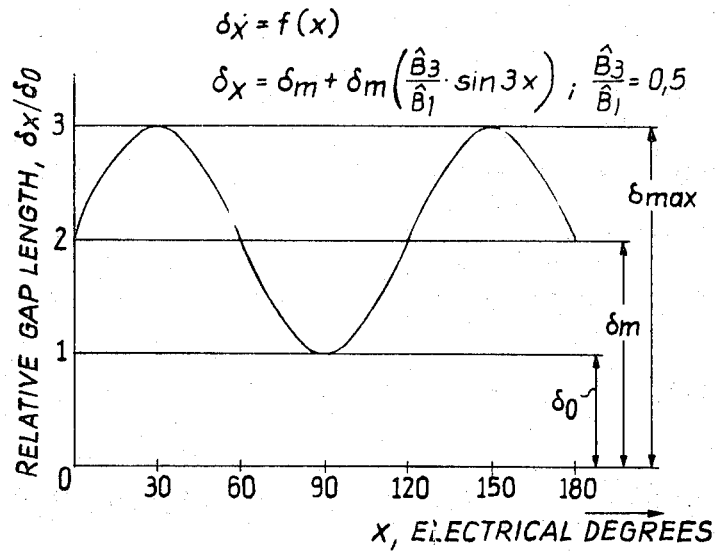
FIG. 2 is a chart containing another graph illustrating the relative variation of the airgap.

This is accomplished, as a part of the present invention by enlarging the airgap at the 30° and at the 150° locations to the extent of the deviation of curve $B_1 \hat{+} B_3$ from a sinusoidal curve and by narrowing it at 90°. A minimum airgap must be maintained, however, for structural reasons. In principle, an airgap is created whose length varies over the pole pitch in the manner shown in FIG. 2, in which $\delta_0$ is the minimum, $\delta_m$ is the median and $\delta_{max}$ the maximum airgap length.

The obtaining of an airgap, strictly speaking, requires the measurement of the magnetic flux path inductance across the pole pitch. The analyzed values for the fundamental and for the field harmonics are then to be inserted into the above-mentioned equations. If, therefore, the field curve of a motor with a uniform airgap is known and analyzed, a single mathematical computation for determining the required airgap size and configuration is sufficient for arriving at the most favorable design of the motor.

In practice, a field waveform analysis will generally not be employed because of the complicated procedures which it entails. As mentioned above, the method makes possible the required qualitative variation in the size of the airgap according to its correct position and in the correct manner with an assumed harmonic-to-fundamental flux amplitude ratio. The quantitative proportion of the maximum airgap length is unknown and must be extrapolated from the given median airgap from various assumed ratios of the peak values of the third field harmonic to the fundamental. This procedure will lead to the most favorably configured airgap after but a few experimental steps.

When the method is applied to shaded-pole motors, the separation of the poles of the main pole portion and the shaded-pole portion must be considered. The damping occurring under the shaded pole because of the short-circuit winding must be considered with an appropriate factor during the construction of the airgap. This damping factor $\alpha$ represents the ratio of the airgap length at one point on the shaded pole to that of the airgap at the corresponding point on the main pole. For the determination of the airgap configuration under the shaded pole, the equation:

$$\delta_x = \alpha \left[ \delta_m + \delta_m \left( \frac{\hat{B}_3}{\hat{B}_1} \sin(3x + \varphi_3) \right) \right] \quad (3)$$

results if only the third field harmonic is considered. This damping factor $\alpha$ has been empirically determined to be about 0.58 through experiments with a particular four-pole shaded-pole motor. With smaller shaded-pole motors, however, this correction of the airgap below the shaded-pole portion may be eliminated.

With internal rotor motors, this method leads to arc-shaped enlargements of the airgap below the main pole portion with a maximum at a pole pitch angle of approximately 30 electrical degrees and an enlargement of the airgap below the shaded pole which, however, can usually be neglected. Contrary to the state of the art, the airgap becomes narrower again toward the main pole tip end. The correction of the airgap leads to a substantial suppression of the harmonics of the flux field.

The manner in which the size of the airgap is determined in accordance with the present invention will be further explained in connection with an embodiment in the form of a four-pole external rotor shaded-pole motor.

Figure 3:
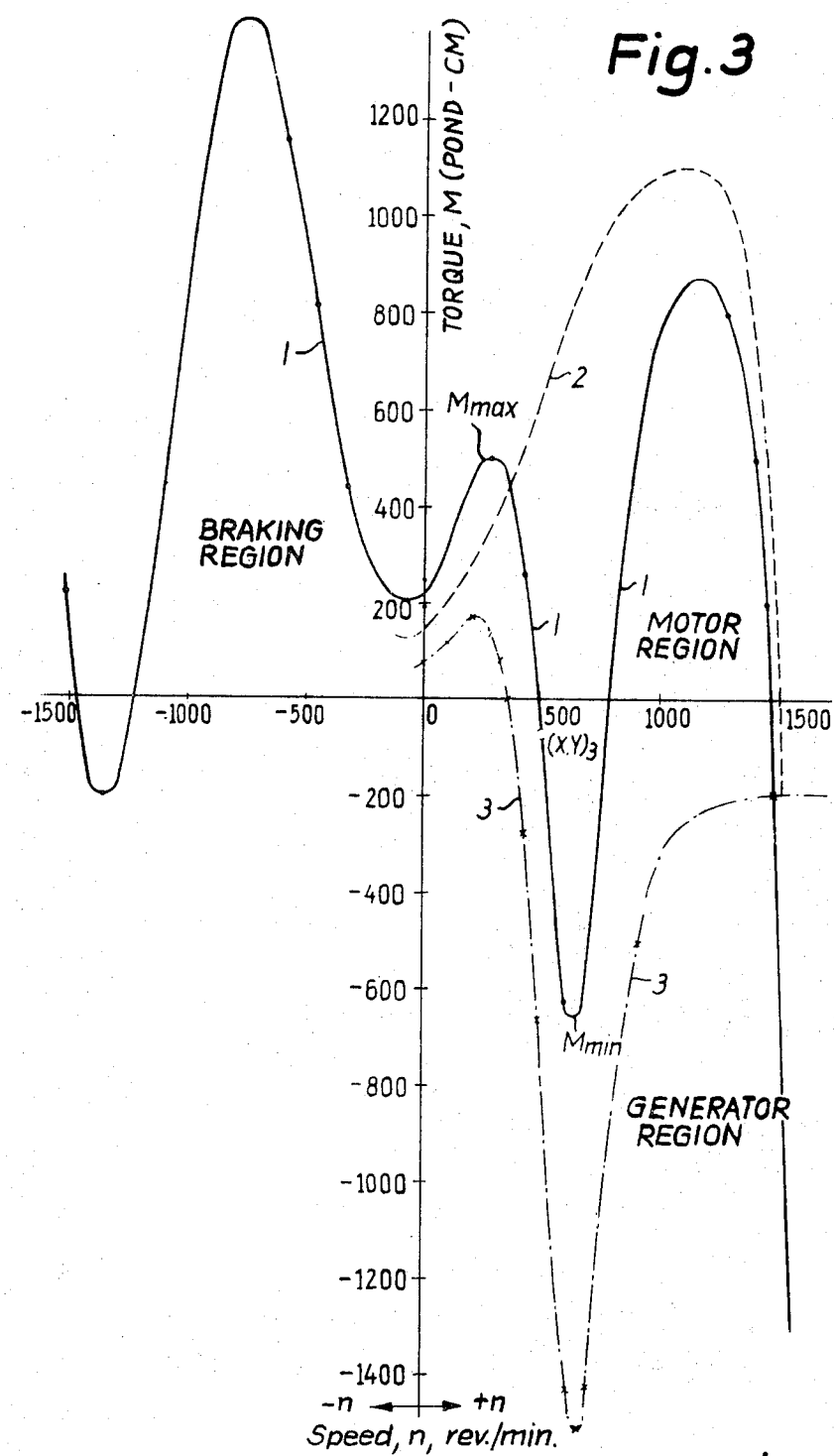
FIG. 3 is a chart containing further curves illustrating the torque-speed curve for a motor of the type with which the present invention is concerned having a constant airgap according to the prior art.

FIG. 3 shows a curve 1 representing the torque-speed characteristic occurring in a motor having a uniform airgap length. The dip in torque extending into the negative torque region is almost as large as the breakdown torque. Such a strong dip is caused substantially by the third field harmonic because at a certain field harmonic the torque-speed characteristic will run approximately through the intersection of the coordinates indicated by this field harmonic and by the maxima and minima of the characteristic. This intersection is designated as $(x, y)_3$ and is found at $x=1,500/3=500$ revolutions per minute (50 Hz.). This determination always applies when there is a very distinct field harmonic, as is the case with the third field harmonic of shaded-pole motors.

The third harmonic is positive, therefore the starting moment produced by the fundamental component of the field must lie below that of the torque-speed characteristic. If it is further assumed that the decreased in rotating speed at the idling point is exclusively determined by the braking field harmonic, then the end of the fundamental characteristic must occur practically at the synchronous speed. Thus, the torque-speed characteristic resulting solely from the fundamental field component can be drawn in as an estimation and is shown in the FIG. 3 by the broken-line curve 2. Subtraction of curve 2 from curve 1 results in the characteristic 3 resulting substantially completely from the third harmonic field component. The extraordinarily strong influence of the third field harmonic is clear. For this harmonic, the ratio of the peak values of the third field harmonic to the fundamental is to be applied as an empirical value of approximately 0.6.

Figure 4:
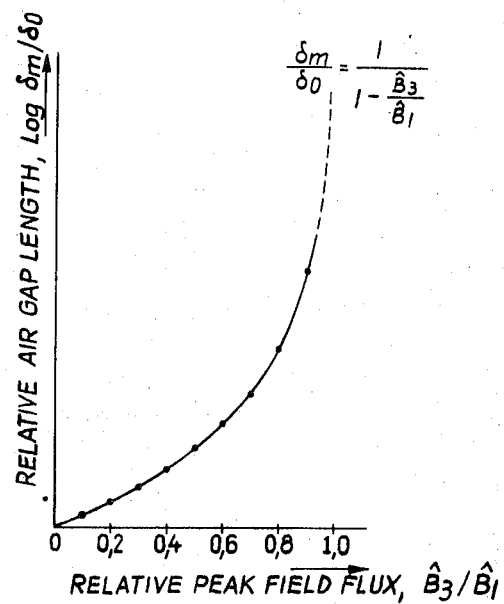
FIG. 4 is a curve illustrating the results obtained by solving equation 4.

From equation (2), with $\delta_x=\delta_0$ and $x=90°$, which is valid for a positive in-phase third harmonic field component, the equation;

$$\frac{\delta_m}{\delta_0} = \frac{1}{1-\frac{\hat{B}_3}{\hat{B}_1}} \qquad (4)$$

results. From equation (4) the value $\delta_m$ required for the solution of equations (1) or (2) can be determined with a given $\delta_0$ and an assumed $\hat{B}_3/\hat{B}_1$, the curve resulting from this equation being shown in FIG. 4 in terms of $\delta_m/\delta_0$ as a function of $\hat{B}_3/\hat{B}_1$.

Figure 5:
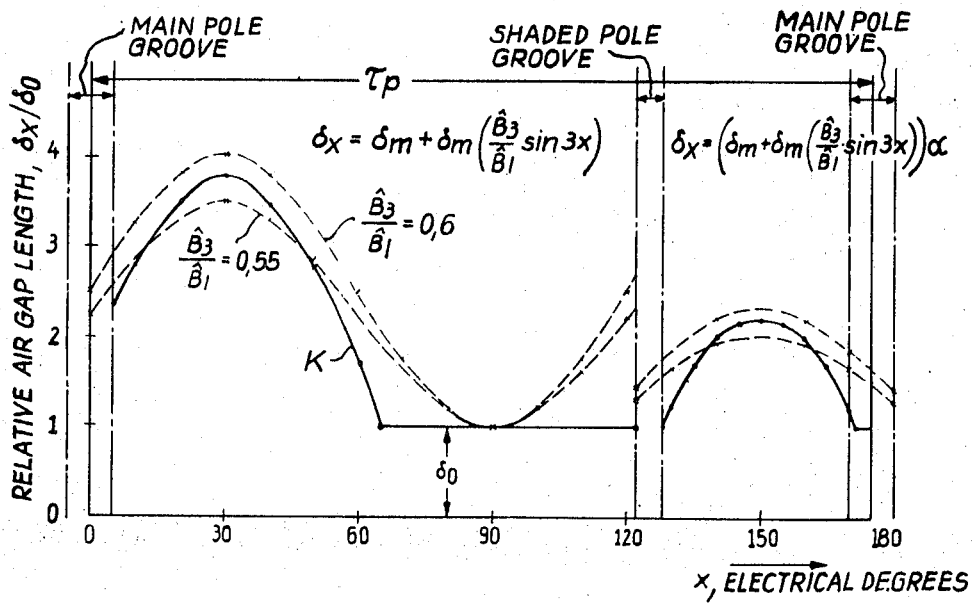
FIG. 5 is a chart containing curves illustrating the variation of the airgap for a salient pole having a shaded-pole portion as used by the present invention.

With this calculated value for $\delta_m$ and the associated value for $\hat{B}_3/\hat{B}_1$ of 0.6, the entire airgap $\delta_x$ can now be calculated. The configuration for this airgap is represented in FIG. 5 in terms of the ratio $\delta_x:\delta_0$ as a function of the pitch angle $x$ across the pole pitch $\tau_p$, wherein the damping factor $\alpha=0.58$ is employed for the shaded-pole portion. The calculation is repeated for determining the optimum configuration with the ratio $\hat{B}_3/\hat{B}_1=0.55$ and the result is also shown in FIG. 5.

FIG. 5 shows two broken-line curves representing the calculated airgap configuration across both the main pole and the shaded pole for two values of $\hat{B}_3/\hat{B}_1$, these values being 0.6 and 0.55.

With reference to the constructive embodiment of the pole lamination cross section, the actual airgap is given the form shown by the solid line K, in order to simplify construction, which does not result in any noticeable decrease in efficiency as compared to the best theoretical configuration of the stator.

Figure 6:
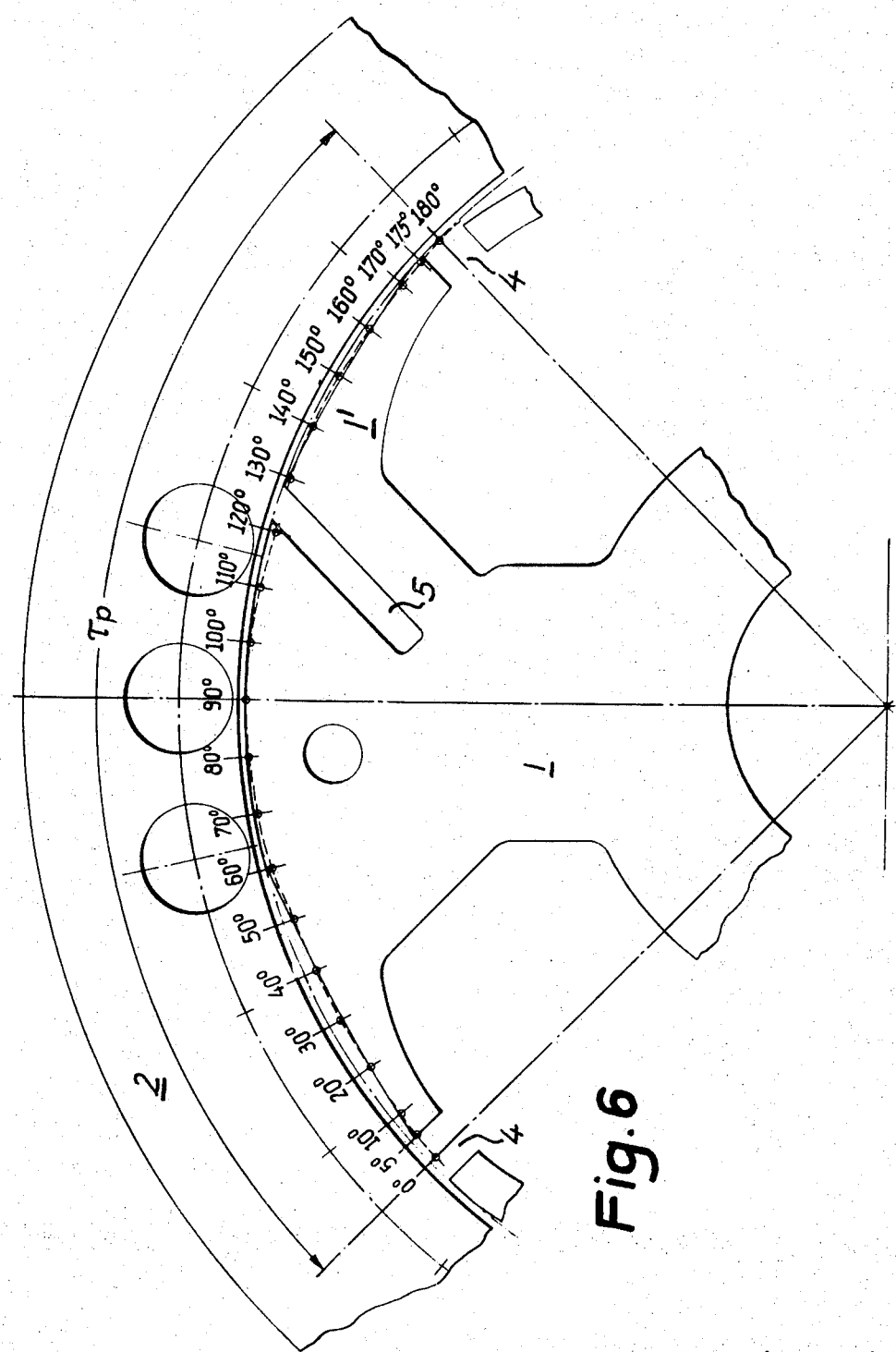
FIG. 6 is a partial, axial view of a motor having an internal stator illustrating the variation of the airgap as used by the present invention.

FIG. 6 is a partial axial view, to scale, of a four-pole motor having its stator formed to produce an airgap whose length varies according to the curve K of FIG. 5. The motor includes an internal stator each pole 1 of which has a shaded-pole portion 1' separated from the main pole portion by a groove, or slit, 5. Each pole is separated from its adjoining poles by grooves, or slits, 4. The motor has an external rotor 4 whose inner surface is cylindrical. The calculated optimum configuration of the stator pole surface is shown in broken lines for purposes of comparison.

The characteristic features of the motor of FIG. 6 are that the airgap narrows at the pole tips and that in shaded-pole motors a change in the airgap length also results under the shaded pole.

In addition to the variation of the airgap of such shaded-pole motors as indicated above in order to suppress the unwanted harmonics in the field, according to the invention, the harmonics of the flux field are further reduced, and the operating characteristics improved, by proper shaping and/or dividing of the salient poles into their main and shaded portions.

According to the present invention, the starting torque and the breakdown torque are first determined without consideration of the configuration of the field harmonic since this determination will, in practice, not be influenced by the elimination of the field harmonic by the change in the size of the airgap, because the field distribution per se remains unchanged. Pole tip changes, however, i.e., changes at the magnetic bridges, to suppress the field harmonics, produce retroactive effects. That is, they produce saturation zones which result in heavy voltage dependence of the torques, particularly of the dip or saddle portion of the torque. Such changes in the pole tips absent any other changes can also result in a reduced efficiency.

According to the invention, the poles are shaped so that the angle enclosed between the neutral axis and the pole axis for each pole is less on the shaded-pole side of the pole axis than on the main pole side and by limiting the shaded-pole arc or shaded-pole cover to one-fifth or less of the pole pitch.

The main pole tip should be designed to be in the shape of a sickle which continuously decreases from a starting width at the point of connection of approximately one-third to one-fourth of the arc of the main pole piece. With normal motor usage and an induction in the yoke (rear induction) of approximately 14,000 Gauss, there results in the pole tip an induction of not more than 18,000 Gauss with an airgap induction of approximately 4,000 Gauss. The cut or slit at the magnetic bridge to determine the neutral axis should be so dimensioned that the stray flux without load (when idling) is 9 to 15 percent of the total flux. In contrast to the state of the art, the main pole field and the shaded-pole field are thus further separated. The resulting increase in the counterinductance across the magnetic bridge results in a high starting torque.

With the elimination of the field harmonics there is also eliminated the need for a reduced number of rotor grooves and for closed grooves. Therefore, according to a further development of the present invention, the number of rotor grooves is increased and open grooves are utilized. The efficiency is thus further increased so that it rises, for example, even for small two-pole motors having a rotor diameter of about 30 mm. and 24 open grooves by about 24 percent, which corresponds to an increase in power output of more than 40 percent, i.e., from 3.8 to 5.6 watts, when compared to motors without airgap enlargement and only 15 grooves. By increasing the number of rotor grooves and with the simultaneously reduced rotor resistance, a high breakdown torque is achieved and a relatively high starting torque, since the stray flux at the rotor is low with a high number of grooves, i.e., doubly linked stray flux occurs.

The number of grooves to be added depends on the rotor diameter. Thus, a rotor diameter of 30 to 35 mm. should have 20 or more associated grooves, compared with the state of the art of only about 15 grooves, a rotor diameter of 38 to 44 mm. should have 22 to about 28 grooves, a rotor diameter of approximately 45 mm. should have 28 to approximately 36 grooves, and a rotor diameter of approximately 55 mm. could have more than 32 grooves.

When modifying state-of-the-art motors according to the invention, and in particular motors having small iron cross sections and short-circuit windings, it may be advantageous to reinforce such motors by enlarging the iron cross sections by about 10 percent and the cross sections of the short-circuit windings by about twice that amount and, if necessary, by providing more than one short-circuit winding, with the outer short-circuit winding again having a larger cross section.

Figure 7:
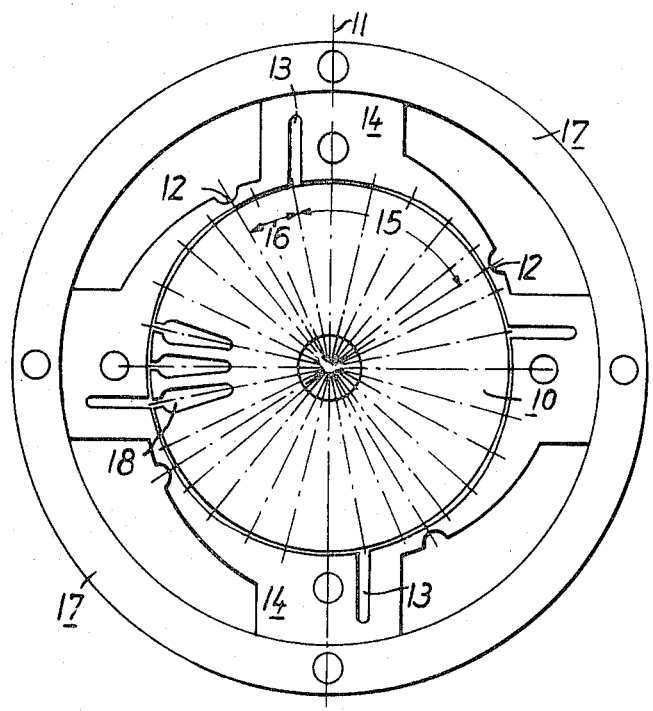
FIG. 7 is a sectional view through the laminations of a four-pole, centrosymmetrical shaded-pole motor according to the present invention having a pole sheet inserted therein.

Referring now to FIG. 7 there is shown a four-pole shaded-pole motor of centrosymmetrical construction which has been modified according to the invention, and is of the type used predominantly for small-size fans, cooling blowers, phonographs, tape recorders, typewriters and the like. For the latter two uses the size of the starting torque is significant. For cooling blowers, however, it is the efficiency of the motors, when they are installed in devices, such as freezers, for moving air which is important. The rotor diameter of such motors typically varies up to approximately 50 mm. Depending on the iron width, the power range extends to approximately 30 watts. The rotor 10 for the stator lamination packet of the motor consists of a pole sheet 14 and annular yoke 17, has a diameter of 45.5 mm., with 28 open grooves 18 (only three of which are shown) of 17.9 mm.$^2$ cross section. The slits 12 indicate the neutral axis and determine, together with slits 13 for the shaded-pole windings, the separation of the pole pitch into main pole arcs 15 and shaded-pole arcs 16. As can easily be seen, the angle between the pole axis 11 and the neutral axis through the slit 12 on the shaded-pole side is less than that on the generally sickle-shaped main pole side.

The copper shaded-pole windings have a cross section of 5.00 mm.$^2$. The airgap is widened in an arc below the main pole arc 15 in the range of a pole pitch angle of 60 electrical degrees starting approximately at slits 12 according to the harmonic field analysis. The maximum of the airgap expanse is at a pitch angle of 30 electrical degrees and here amounts to approximately twice the minimum airgap size. Compared to the state-of-the-art motors in the form of a motor having 18 rotor grooves and without airgap expansion, the following comparative values, with the same input, without load, of 35 watts result. The starting torque increases from 410 p.cm. (Pond-cm) to 620 p.cm., the breakdown torque from 1,330 p.cm. to 1,750 p.cm., the power output from 10.8 to 14.3 watts, the efficiency from 23.5 to 30.5 percent and the torque for reaching peak speed saddles from 560 to 700 p.cm., with the total of iron weight reduced to 95 percent.

Figure 8:
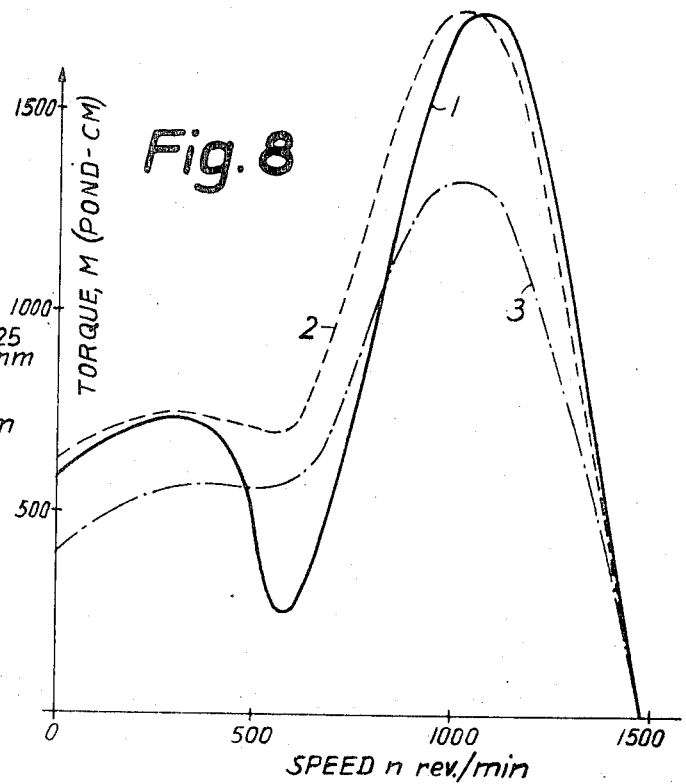
FIG. 8 shows the torque characteristics of a shaded-pole motor of the type shown in FIG. 7, according to the state of the art and according to the present invention.

FIG. 8 shows the associated starting torque characteristic curves for the motor shown in FIG. 7 before and after modification according to the invention. Curve 3 illustrates the starting torque characteristic for the motor according to the state of the art, curve 1 after having been improved by pole arc division, according to the present invention with increased number of grooves and curve 2 after having been further improved by widening of the airgap according to the harmonic field analysis.

Figure 9:
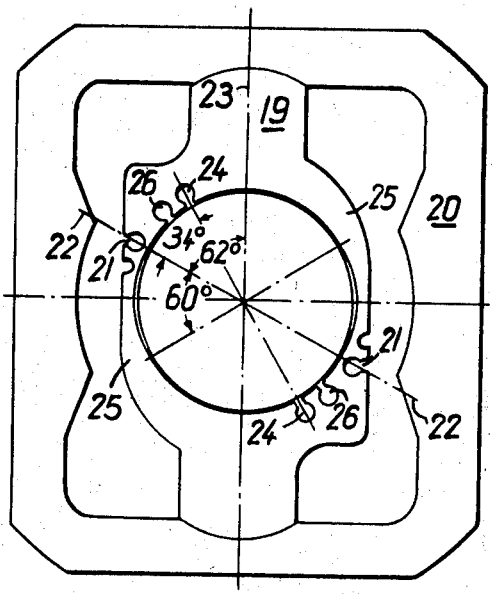
FIG. 9 shows a section of the laminations of a larger two-pole shaded-pole motor with pole sheet constructed according to the invention.

FIG. 9 shows an example of a section through the laminations of a larger two-pole shaded-pole motor having a power output of 90 to 250 watts depending on the iron length. The pole sheet 19 is inserted into the yoke frame 20 which has a basically rectangular shape of 118×124 mm.$^2$. In this embodiment the neutral zone is located at the two slits 21 so that the connecting line 22 can be considered the neutral axis between the two slits. On the side of the shaded pole the axis 22 forms an angle of less than 90 electrical degrees with the pole axis 23, namely an electrical angle of 62°. The shaded-pole arc, limited by the neutral axis 22 and the axis through the inner shaded-pole groove 24, is one-fifth or less of the pole pitch, namely an electrical angle of 34°. A further shaded-pole winding may be disposed in the grooves 26. For a distance of an arc of 60 electrical degrees along the main pole tip 25 measured from the neutral axis 22, the airgap as indicated is widened according to the present invention. The rotor has a diameter of 55 mm. and 36 grooves (not shown).

Figure 10:
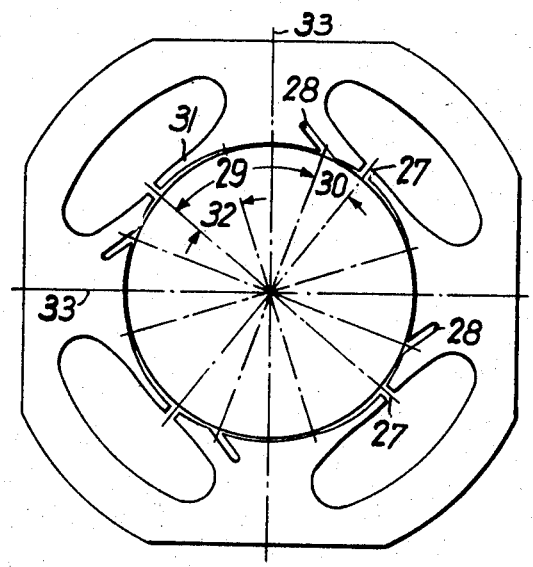
FIG. 10 shows a section of the laminations of a larger four-pole shaded-pole motor without a stray flux sheet constructed according to the invention.

FIG. 10 shows a four-pole shaded-pole motor without a stray flux sheet having an external diameter of 136 mm. and a power output of 140 watts with an iron length of 50 mm., and an output of 105 watts with an iron length of 32 mm. The neutral axes in this type of motor are defined by the lines passing through the center of the groove slits 27. The neutral axes enclose an angle of less than 90 electrical degrees with the pole axes 33 on the shaded-pole side and consequently an angle less than that enclosed on the main pole side. The slits 28 for the shaded-pole windings separate the poles into the main pole arcs 29 and the shaded-pole arcs 30, with the shaded-pole arcs being again equal to or less than one-fifth of the pole pitch. The airgap below the main pole arc, here the main pole tips 31, is again widened in the areas 32, corresponding to 60 electrical degrees measured from the neutral axes passing through the groove slits 27, according to the harmonic field analysis. The rotor has a diameter of 74 mm. and 38 grooves (not shown).

It will be understood that the above description of the present invention is susceptible to various modifications, changes and adaptations, and the same are intended to be comprehended within the meaning and range of equivalents of the appended claims.

We claim:

1. In a shaded-pole motor having centrosymmetrical construction and concentrated windings on salient poles and a partially widened airgap, the improvement wherein each of such salient poles is shaped so that:
   a. the angle enclosed between the pole axis and the neutral axis, on the shaded-pole side of the pole axis is less than that on the main pole side;
   b. the shaded-pole arc is at most equal to one-fifth of the pole pitch; and
   c. the airgap adjacent to the pole has a configuration across the main pole portion of each pole face which conforms substantially to the equation:

$$\delta_x = \delta_m + \delta_m \left[ \frac{\hat{B}_3}{\hat{B}_1} \sin 3x \right]$$

where:
   $\delta_x$ = the desired airgap length at each angular position $x$ across the pole pitch;
   $\delta_m$ = a preselected median airgap length;
   $\hat{B}_1$ = the peak value of the fundamental component of the excitation flux field of a similar motor having an unvarying airgap length;
   $\hat{B}_3$ = the peak value of the third harmonic component of the flux field of the similar motor; and
   $x$ = the angular position of each point along the pole pitch in electrical degrees.

2. The motor as defined in claim 1 wherein the main pole tip at its point of connection has a width equal to about one-third to one-fourth of its pole arc and becomes continuously narrower in the form of a sickle.

3. A motor as defined in claim 1 wherein with an inducted magnetic flux in the yoke of the stator of the said motor of approximately 14,000 Gauss, the inducted magnetic flux in the pole tip is not more than 18,000 Gauss, and approximately 4,000 Gauss in the said airgap.

4. A motor as defined in claim 1 wherein said motor is the type having magnetic bridges between the poles formed by slits in the stator laminations to provide a narrow magnetic passage, said slit having a depth which causes a stray flux, when the motor is idling without load, to be approximately 9 to 15 percent of the total flux.

5. A motor as defined in claim 1 wherein each said salient pole is shaped to have a minimum airgap length adjacent to the main pole portion at a pole pitch angle of 30 electrical degrees measured from the neutral axis.

6. A motor as defined in claim 1 wherein the variation of the length of the airgap adjacent to the main pole portion extends over a pole arc of approximately 60 electrical degrees measured from the neutral axis.

7. A motor as defined in claim 5 wherein the variation of the length of the airgap adjacent to the main pole portion extends over a pole arc of approximately 60 electrical degrees measured from the neutral axis.

8. A motor as defined in claim 1 wherein the airgap is also lengthened adjacent to the shaded portion of each pole, with the maximum airgap length occurring in the center region of the shaded-pole arc.

9. A motor as defined in claim 1 wherein the number of rotor grooves is increased with respect to the diameter of the rotors so that a rotor having a diameter of 30 mm. has 20 or more associated grooves, of 38 mm. has 22 or more grooves, of 45 mm. has 28 or more grooves, and of 55 mm. has 32 and more grooves.

10. A motor as defined in claim 9 wherein the grooves are magnetically open.

11. A method of improving the operating characteristics of a shaded-pole motor of centrosymmetrical construction having salient poles and concentrated windings comprising:

1. forming each salient pole so that
   a. the angle enclosed between the pole axis and the neutral axis, on the shaded-pole side of the pole axis is less than that on the main pole side; and
   b. the shaded-pole arc is at most equal to one-fifth of the pole pitch; and
2. shaping the pole face of each salient pole so that the airgap adjacent to the pole has a configuration across the main pole portion thereof which conforms substantially to the equation:

$$\delta_x = \delta_m + \delta_m \left[ \frac{\hat{B}_3}{\hat{B}_1} \sin(3x + \varphi_3) \right]$$

$\delta_x$ = the desired airgap length at each angular position $x$ across the pole pitch;
$\delta_m$ = a preselected median airgap length;
$\hat{B}_1$ = the peak value of the fundamental component of the excitation flux field of a similar motor having an unvarying airgap length;
$\hat{B}_3$ = the peak value of the third harmonic component of the flux field of the similar motor;
$\sigma_3$ = the phase angle of the third harmonic component relative to the fundamental component of the flux field; and
$x$ = the angular position of each point along the pole pitch in electrical degrees.

12. A shaded-pole motor as defined in claim 1 wherein each of said salient poles is shaped so that the airgap adjacent to the pole has a configuration across the main pole portion of each pole face which conforms substantially to the equation:

$$\delta_x = \delta_m + \delta_m \left[ \frac{\hat{B}_3}{\hat{B}_1} \sin(3x + \varphi_3) + \frac{\hat{B}_5}{\hat{B}_1} \sin(5x + \varphi_5) \ldots + \frac{\hat{B}_n}{\hat{B}_1} \sin(nx + \varphi_n) \right]$$

where:
$\hat{B}_5$ = the peak value of the fifth harmonic component of the flux field of the similar motor;
$\hat{B}_n$ = the peak value of the $n$th harmonic component of the flux field on the similar motor; and
$\sigma_3$, $\sigma_5$, and $\sigma_n$ = the phase angles of the third, fifth and $n$th harmonic components, respectively, relative to the fundamental component of the flux field.

13. The method defined in claim 11 wherein the pole face of each salient pole is shaped so that the airgap adjacent to the pole has a configuration across the main pole portion of each pole face which conforms substantially to the equation:

$$\delta_x = \delta_m + \delta_m \left[ \frac{\hat{B}_3}{\hat{B}_1} \sin(3x + \varphi_3) + \frac{\hat{B}_5}{\hat{B}_1} \sin(5x + \varphi_5) \ldots + \frac{\hat{B}_n}{\hat{B}_1} \sin(nx + \varphi_n) \right]$$

where:
$\hat{B}_5$ = the peak value of the fifth harmonic component of the flux field of the similar motor;
$\hat{B}_n$ = the peak value of the $n$th harmonic component of the flux field on the similar motor; and
$\sigma_5$, and $\sigma_n$ = the phase angles of the fifth and $n$th harmonic components, respectively, relative to the fundamental component of the flux field.

* * * * *